United States Patent
Iwasaki (10) Patent No.: US 8,221,569 B2
(45) Date of Patent: Jul. 17, 2012

(54) METHOD OF PRODUCING TIRE COMPONENT MEMBER

(75) Inventor: Yoshikazu Iwasaki, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 305 days.

(21) Appl. No.: 12/449,976

(22) PCT Filed: Feb. 28, 2008

(86) PCT No.: PCT/JP2008/053525
§ 371 (c)(1),
(2), (4) Date: Sep. 10, 2009

(87) PCT Pub. No.: WO2008/111402
PCT Pub. Date: Sep. 18, 2008

(65) Prior Publication Data
US 2010/0000660 A1    Jan. 7, 2010

(30) Foreign Application Priority Data
Mar. 13, 2007 (JP) .............................. 2007-062791

(51) Int. Cl.
*B29D 30/16* (2006.01)
*B29D 30/30* (2006.01)
(52) U.S. Cl. ...................... 156/117; 156/397; 156/405.1
(58) Field of Classification Search .................. 156/117, 156/130, 133, 397, 405.1, 406.4
See application file for complete search history.

(56) References Cited

U.S. PATENT DOCUMENTS

| | | | | |
|---|---|---|---|---|
| 3,157,542 A | * | 11/1964 | Trevaskis | ...................... 156/133 |
| 3,674,582 A | | 7/1972 | Leblond | |
| 4,170,509 A | * | 10/1979 | Kubinski | .................. 156/405.1 |

(Continued)

FOREIGN PATENT DOCUMENTS

| | | |
|---|---|---|
| JP | A-2001-9928 | 1/2001 |
| JP | A-2003-291225 | 10/2003 |
| JP | A-2004-181950 | 7/2004 |
| JP | A-2004-202804 | 7/2004 |
| WO | WO 02/055289 A1 | 7/2002 |
| WO | WO 03/106152 A1 | 12/2003 |
| WO | WO 2011/051798 A1 | 5/2011 |

OTHER PUBLICATIONS

Jan. 16, 2012 Supplementary European Search Report issued in European Patent Application No. 08712096.0.

*Primary Examiner* — Geoffrey L Knable
(74) *Attorney, Agent, or Firm* — Oliff & Berridge, PLC (57) ABSTRACT

The present invention provides a method of producing a tire component member, which method allows rubber strip pieces to be sequentially attached without forming a gap therebetween. A method of producing a tire component member by diagonally and sequentially attaching a rubber strip piece 1 having an elongated parallelogram-like shape in the circumferential direction on an outer peripheral curved face of a drum 5 having a curved face including the center portion more expanded than respective side portions, comprising the steps of: sequentially holding by adhesive force the rubber strip piece 1 from a leading end thereof, with a disposition of the rubber strip piece inclined by a predetermined angle with respect to the drum 5 having a curved face, by an adhesive drum 11 capable of holding by adhesive force the rubber strip 1 piece onto a peripheral surface thereof, while the adhesive drum is rotated; and press-attaching the rubber strip piece 1 held by adhesive force continuously from the leading end thereof, onto an outer peripheral curved face of the drum 5 having a curved face which is being rotated, while the rubber strip piece is moved along the direction of the rotation axis of the drum 5 having a curved face within a predetermined range, to transfer the rubber strip piece to the drum having a curved face.

5 Claims, 7 Drawing Sheets

U.S. PATENT DOCUMENTS

| | | | | |
|---|---|---|---|---|
| 4,240,863 | A | * | 12/1980 | Vinton .......................... 156/361 |
| 4,504,337 | A | | 3/1985 | Askam et al. |
| 4,738,743 | A | * | 4/1988 | Satoh et al. ................. 156/405.1 |
| 4,858,901 | A | | 8/1989 | Okuyama et al. |
| 6,723,194 | B2 | * | 4/2004 | Takaoka ........................ 156/117 |
| 2003/0024627 | A1 | * | 2/2003 | Ohkubo ........................ 156/123 |
| 2003/0056875 | A1 | | 3/2003 | Wright |
| 2005/0269014 | A1 | * | 12/2005 | Mizota ........................ 156/117 |
| 2006/0011285 | A1 | | 1/2006 | Suda |
| 2007/0102120 | A1 | | 5/2007 | Yoshii |

\* cited by examiner

FIG. 7

METHOD OF PRODUCING TIRE COMPONENT MEMBER

TECHNICAL FIELD

The present invention relates to a method of producing a tire component member such as a belt or the like by diagonally and sequentially attaching a rubber strip piece having an elongated parallelogram shape in the circumferential direction on an outer peripheral curved face of a drum having a curved face.

PRIOR ART

Examples of a tire component member produced by such a method as described above include a belt member having cords embedded therein, which cords are biased with respect to the tire circumferential direction and, specifically, an example disclosed in a patent application previously filed by the applicant of the present application (see WO2002/055289 pamphlet) in which a belt as described above is formed on a drum having a curved face.

Figure 6:
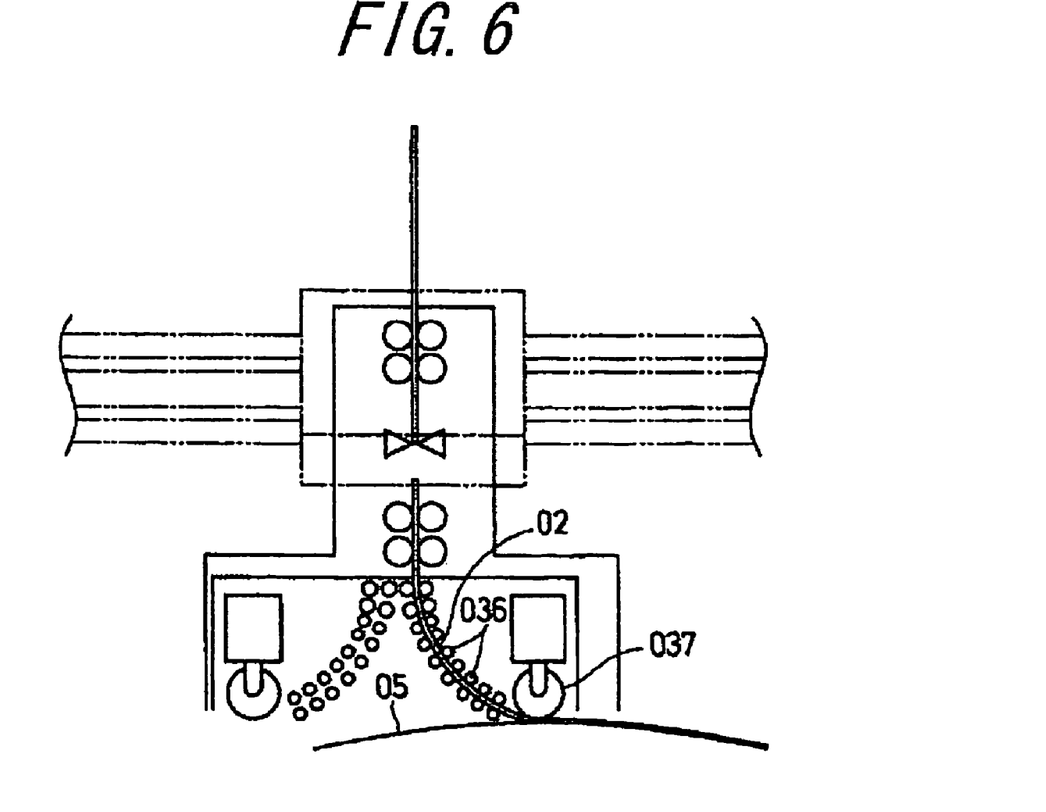
FIG. 6 is a schematic view showing a conventional rubber strip piece-attaching apparatus.

The method of producing a belt member disclosed in WO2002/055289 pamphlet will be described with reference to FIG. 6. A rubber strip piece 02 having an elongated parallelogram-like shape is nipped in the thickness direction thereof between plural guide rollers 036 positioned in along an arcuate line, such that the nipped rubber strip piece is guided and fed onto an outer peripheral curved face of a drum 05 having a curved face in a direction substantially tangent to the curved face, whereby a pressing roller 037 pressingly attaches the rubber strip piece 02 thus fed on the drum having a curved face.

DISCLOSURE OF THE INVENTION

A leading triangular-shaped end portion of the rubber strip piece 02, which has been curved in an arcuate manner due to the constraint by the guide roller 036, is pressingly attached to the drum 05 having a curved face by the pressing roller 037 when the leading triangular-shaped end portion comes out of the guide roller 036 and is released from the constraint to be free.

Figure 7:
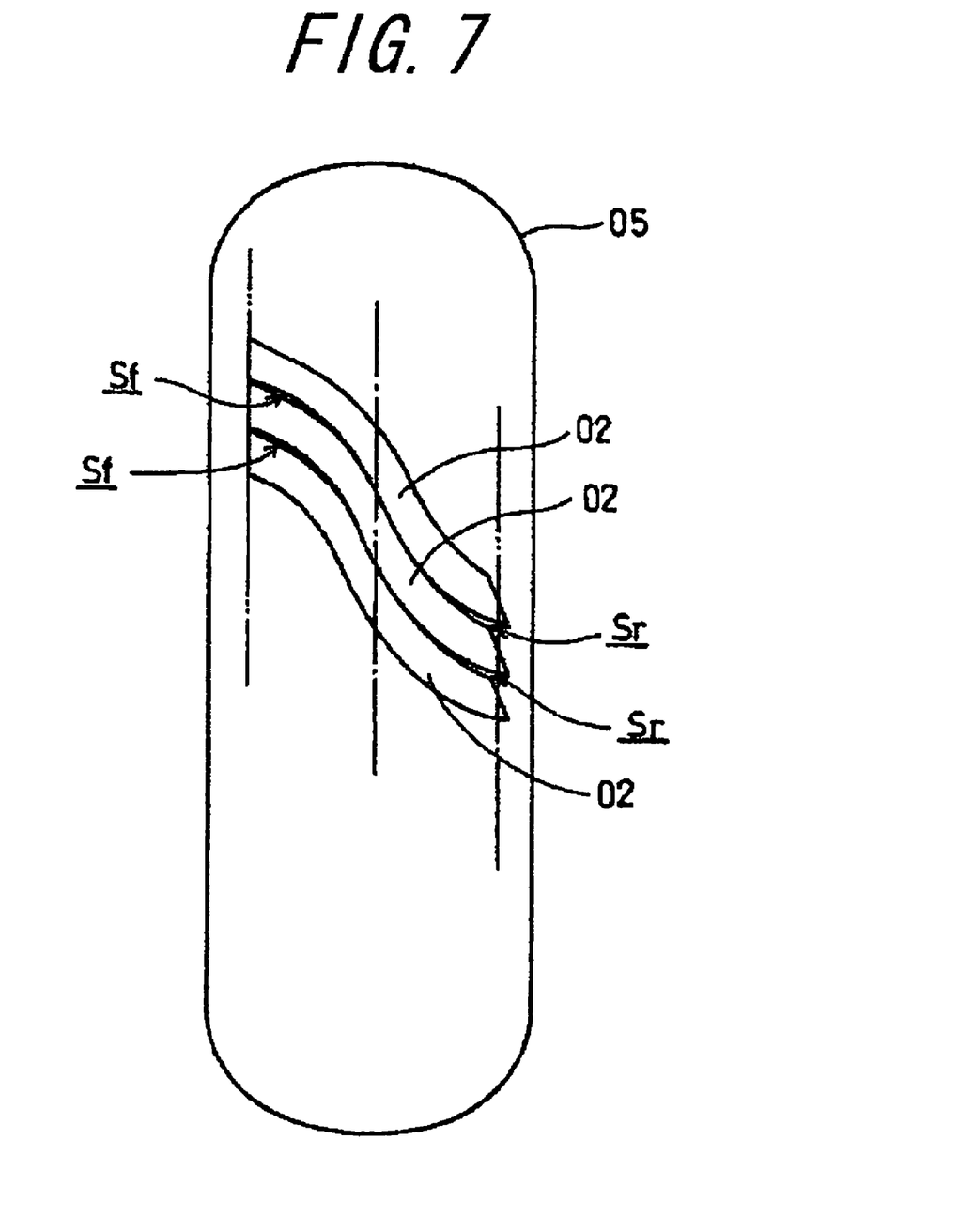
FIG. 7 is a view showing a state in which the rubber strip pieces have been attached on the drum having a curved face in the prior art.

As a result, attachment of the leading triangular-shaped end portion of the rubber strip piece 02 in a free state onto the drum 05 having a curved face is not stably done in terms of position and posture, whereby as shown in FIG. 7, a gap Sf tends to be generated between the first attached portion of the rubber strip piece 02 and a portion thereof continuous with the leading triangular-shaped end portion.

Further, trailing triangular-shaped end portion of the rubber strip piece 02 is also pressingly attached to the drum 05 having a curved face by the pressing roller 036 when the trailing triangular-shaped end portion comes out of the guide roller 036 and is released from the constraint to be free to return to a linear shape.

Accordingly, as shown in FIG. 7, an acute angle end portion of the trailing triangular-shaped end of the rubber strip piece 02 in a free state is attached in a manner that the acute angle end portion is distorted toward the obtuse angle end portion, whereby a gap Sr tends to be formed between the portion of the rubber strip piece 02 attached in advance and the obtuse angle end portion.

These gaps Sf and Sr result in air trapped in rubber between these gaps and a belt member overlappinply attached thereto and thus deteriorate the quality of the product tire. The present invention has been contrived in view of such a problem described above and an object thereof is to provide a method of producing a tire component member, in which a rubber strip piece can be sequentially attached without forming gaps therebetween.

In order to achieve the aforementioned object, in a first aspect of the present invention, a method of producing a tire component member by diagonally and sequentially attaching a rubber strip piece having an elongated parallelogram-like shape in the circumferential direction on an outer peripheral curved face of a drum having a curved face including the center portion more expanded than respective side portions, comprises the steps of:

sequentially holding by adhesive force the rubber strip piece from a leading end thereof, with a disposition of the rubber strip piece inclined by a predetermined angle with respect to the drum having a curved face, by an adhesive drum capable of holding by adhesive force the rubber strip piece onto a peripheral surface thereof, while the adhesive drum is rotated; and press-attaching the rubber strip piece held by adhesive force continuously from the leading end thereof, onto an outer peripheral curved face of the drum having a curved face which is being rotated, while the rubber strip piece is moved along the direction of the rotation axis of the drum having a curved face within a predetermined range, to transfer the rubber strip piece to the drum having a curved face.

In a second aspect of the present invention, the method of producing a tire component member of the first aspect is characterized in that, when the rubber strip piece held by adhesive force on the adhesive drum is continuously press-attached from the leading end thereof onto the drum having a curved face which is being rotated so that the rubber strip piece is transferred to the drum having a curved face, a pressing roller presses the rubber strip piece against the drum having a curved face.

In a third aspect of the present invention, the method of producing a tire component member of the first or the second aspect is characterized in that the adhesive drum is driven at an outer peripheral face speed equal to or lower than the speed of the outer peripheral curved face of drum having a curved face and that a one-way clutch is installed in a rotation drive transmission system.

In a fourth aspect of the present invention, the method of producing a tire component member of any of the first to the third aspects is characterized in that a metal cord is embedded in the rubber strip piece such that the metal cord is disposed along the longitudinal direction of the rubber strip piece and the adhesive drum is a magnet drum.

According to the method of producing a tire component member of the first aspect, the adhesive drum sequentially holds by adhesive force the rubber strip piece from a leading end thereof, with a disposition of the rubber strip piece inclined by a predetermined angle with respect to the drum having a curved face, and the rubber strip piece held by adhesive force is continuously press-attached from the leading end thereof onto an outer peripheral curved face of the drum having a curved face which is being rotated, with the rubber strip piece thus held being moved along the direction of the rotation axis of the drum having a curved face within a predetermined range, to transfer the rubber strip piece to the drum having a curved face. Therefore, the rubber strip piece is transferred as it is to a desired position at the outer peripheral curved face of the drum having a curved face in a state in which any portion from the leading end to the trailing end, of the rubber strip piece, is held by adhesive force on the adhesive drum such that the shape there of is maintained, whereby no gap is formed between a portion of the rubber strip piece attached in advance and a portion thereof subsequently attached and thus high quality of a product tire can be maintained.

According to the method of producing a tire component member of the second aspect, when the rubber strip piece held by adhesive force on the adhesive drum is continuously press-attached from the leading end thereof onto the drum having a curved face which is being rotated so that the rubber strip piece is transferred to the drum having a curved face, a pressing roller as an independent member presses the rubber strip piece against the drum having a curved face (on the downstream side of the adhesive drum press-attaching the rubber strip piece), whereby the rubber strip piece held by adhesive force on the adhesive drum can be reliably peed off from the adhesive drum and reliably transferred to the drum having a curved face.

According to the method of producing a tire component member of the third aspect, the adhesive drum is driven at an outer peripheral face speed equal to or lower than the speed of the outer peripheral curved face of drum having a curved face and a one-way clutch is installed in a rotation drive transmission system. As a result, the adhesive drum holds by adhesive force the rubber strip piece thereon as it rotates and then guides the rubber strip piece to a position where the piece is to be transferred; respective sides of the rubber strip piece are fed out by rotations of the drum having a curved face and the adhesive drum when the transfer is started, so that the leading end of the rubber strip piece can be moved smoothly; then an outer peripheral face speed of the adhesive drum is adjusted to the speed of the outer peripheral curved face of drum having a curved face by the one-way clutch, so that wrinkles or the like due to difference in speed is prevented from occurring and a stable transfer of the rubber strip piece can be effected.

According to the method of producing a tire component member of the fourth aspect, a metal cord is embedded in the rubber strip piece such that the metal cord is disposed along the longitudinal direction of the rubber strip piece and the adhesive drum is a magnet drum. As a result, the rubber strip piece can be transferred to the drum having a curved face in a state where the magnet drum, adhering the metal cords, holds by adhesive force the rubber strip piece on the outer peripheral face thereof and thus maintains the relative less distorted shape of the rubber strip piece.

EXPLANATION OF REFERENCE NUMERALS

1 Rubber strip member
5 Curved face drum
6 Drum driving mechanism
7 Servomotor
10 Rubber strip piece-attaching apparatus
11, 12 Magnet drum
13 Frame body
14, 15 One-way clutch
16, 17 Servo motor
18, 19 Pressing roller
20, 21 Pressing roller
22, 23 Guide roller
25 Lateral direction sliding base
26 Arcuate-shaped rail
27 Vertical direction sliding base
28 Rails
30 Front-Rear direction sliding base
31 Rails
32 Air cylinder
35 Base
36 Rails
37 Air cylinder
40 Ball screw mechanism
41 Ball screw
42 Servo motor
43 Nut
43g Driven gear
44 Nut holder
45 Support member
46 Servo motor
46g Drive gear
47 Intermediate shaft
47g Intermediate gear
50 Guide member
51 Rail
52 Sliding member
53 Magnet

BEST MODE FOR CARRYING OUT THE INVENTION

Figure 1:
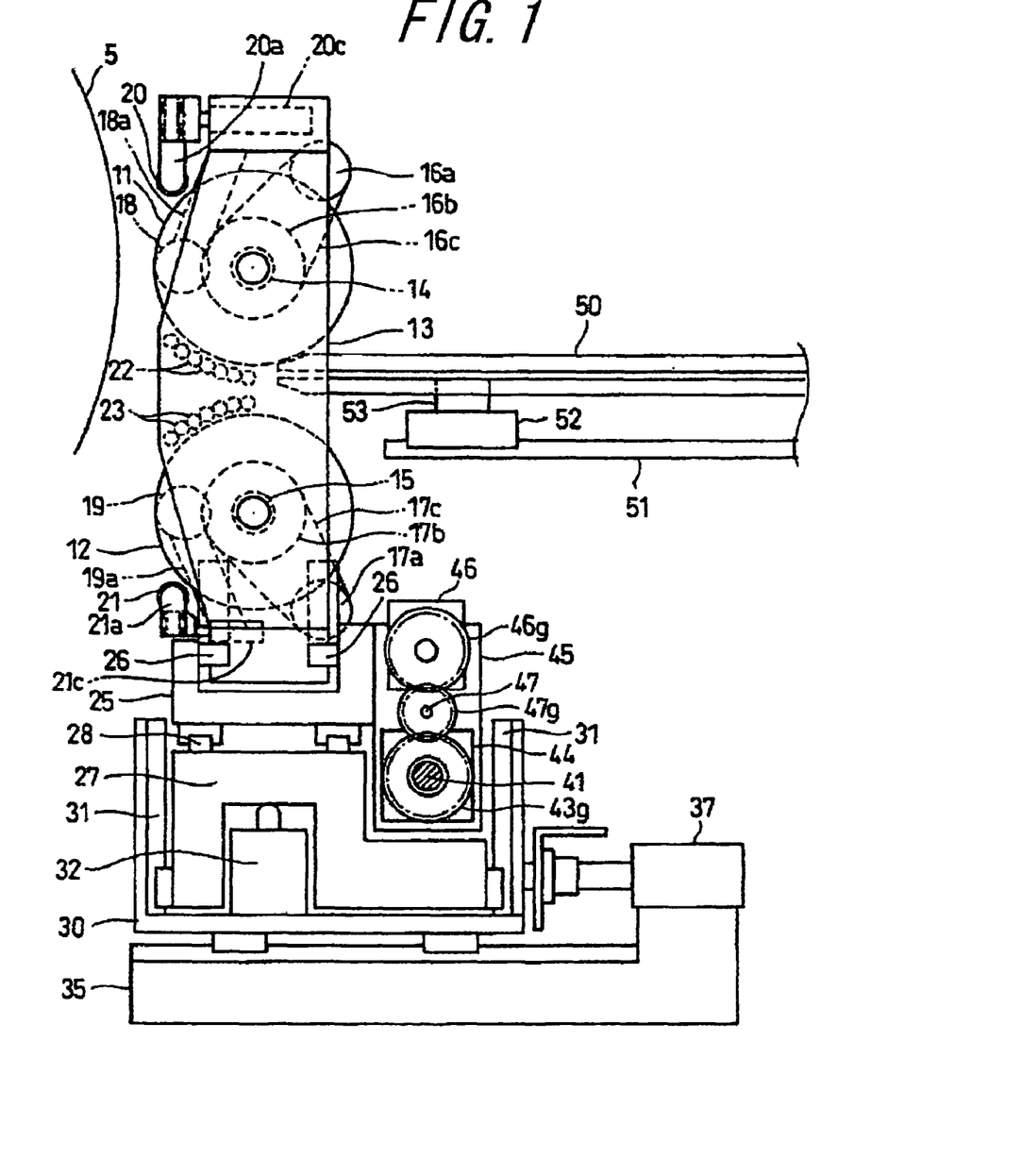
FIG. 1 is a side view showing a part of a drum having a curved face and the entire structure of a rubber strip piece-attaching apparatus.
Figure 2:
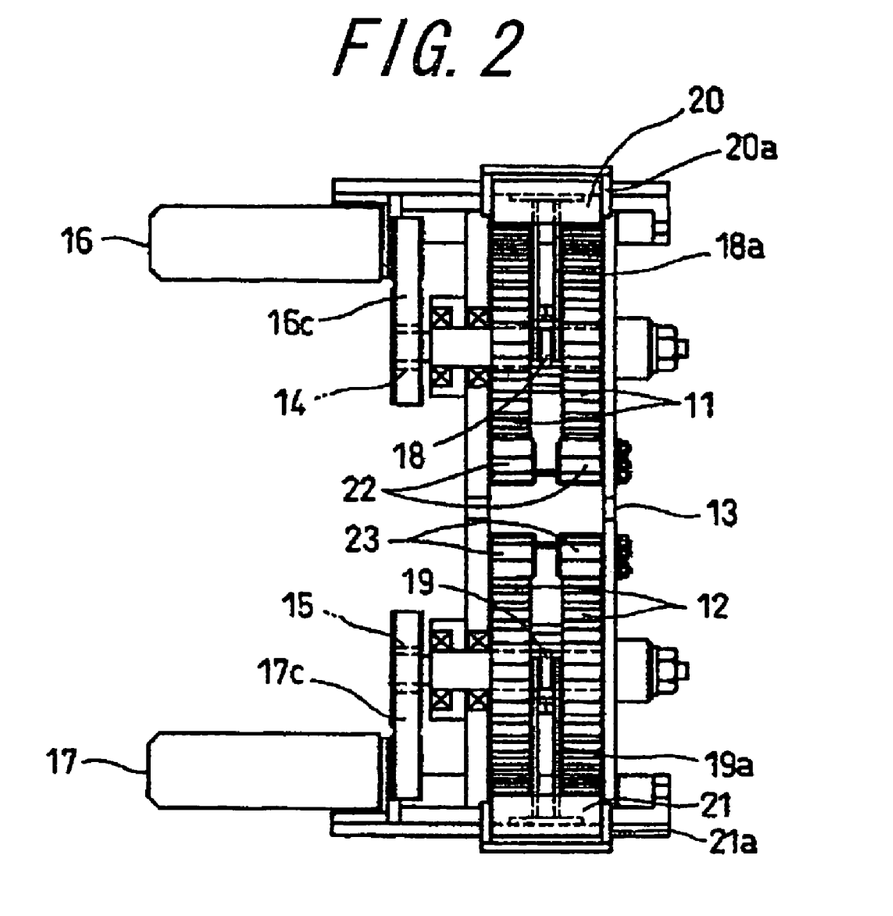
FIG. 2 is a front view of the main portions of the rubber strip piece-attaching apparatus.
Figure 3:
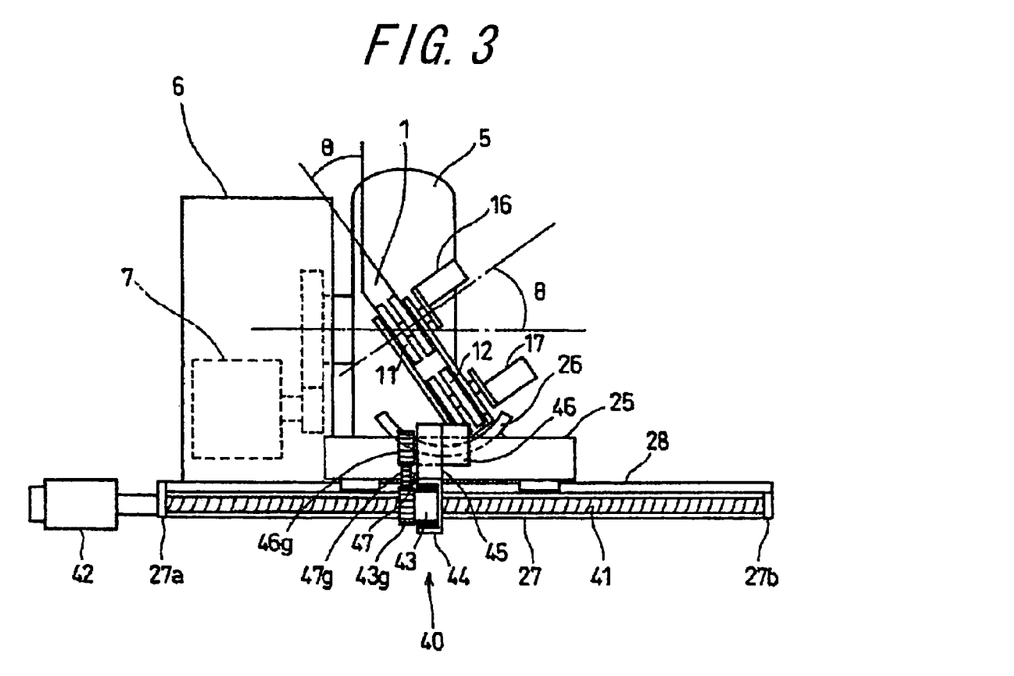
FIG. 3 is a rear view of the main portions of the rubber strip piece-attaching apparatus.

Hereinafter, an embodiment of the present invention will be described with reference to FIGS. 1 to 5. The tire component member produced in the present embodiment is a belt member which is produced by attaching rubber strip pieces on an outer peripheral face of a drum 5 having a curved face (the outer peripheral face of the drum may be constituted of a carcass ply or the like). FIG. 1 is an overall side view of the drum 5 having a curved face and a rubber strip piece-attaching apparatus 10. FIG. 2 is a front view of the main portions of the rubber strip piece-attaching apparatus 10. FIG. 3 is a rear view of the main portions of the same rubber strip piece-attaching apparatus.

The drum 5 having a curved face is supported by a rotation shaft horizontally extending from a servo motor 7 of a drum driving mechanism 6 and rotation-driven by the servo motor (refer to FIG. 3). In the rubber strip piece-attaching apparatus 10, a pair of upper and lower magnet drums 11, 12, facing the drum 5 having a curved face, is pivotally supported by rotational axes 11a, 12a, respectively, on side plates of a frame 13.

The rotational axes 11a, 12a have pulleys 16b, 17b by way of one-way clutches 14, 15, respectively, at the end portions protruding from one of the side plates. Timing belt pulleys 16c, 17c are suspended between the pulleys 16b, 17b and pulleys 16a, 17a respectively fitted on the driving shaft of servo motors 16, 17 mounted on the frame body 13.

Each magnet drum 11, 12 is provided with a groove formed at the axially center portion thereof, which groove sections the drum into two lateral parts. Magnets are disposed along one turn of the outer periphery of the drum. Arms 18a, 19a extend from the frame body 13 into the center grooves of the magnet drums 11, 12, respectively. Pressing rollers 18, 19 having narrow widths are pivotally supported at the distal ends of the arms, respectively. The pressing rollers 18, 19 are respectively disposed such that outer peripheral faces thereof are located slightly on the downstream side than the faces of the magnet drums 11, 12 facing the drum 5 having a curved face.

Further, pressing rollers 20, 21 having relatively wide widths are pivotally supported by bearings 20a, 21a on the further downstream side of the pressing rollers 18, 19, respectively, such that the pressing rollers 20, 21, together with the bearings 20a, 21a, are rotatable around an axes orthogonal to the rotation center axes of the magnet drums 11, 12, respectively. The pressing rollers 20, 21 are rotatably retained at ends, protruding toward the drum 5 having a curved face, of rods of cylinders 20c, 21c mounted on the frame body 13 such that the pressing rollers 18, 19 are capable of approaching/receding from the drum 5 having a curved face. Yet further, plural guide rollers 22, 23 are disposed on an arcuate line along the outer peripheries of the magnet drums 11, 12, respectively, from positions at which the magnet drums 11, 12 face each other toward the drum 5 having a curved face.

The base portions 13a at the lower end of the frame body 13 supporting the magnet drums 11, 12 and the like as described above are slidably engaged with a pair of front and rear arcuate rails 26, 26 fixed on a lateral (left-right hand side) direction sliding base 25 such that the frame body 13 is guided and swingably supported by the arcuate rails 26, 26. Accordingly, the posture of the magnet drums 11, 12 facing the drum 5 having a curved face can be inclined by swinging the magnet drums in the lateral or left-right hand side direction.

The lateral direction sliding base 25 is slidably supported by a pair of front and rear rails 28, 28 provided on a vertical direction sliding base 27 so as to extend in the lateral direction. The vertical direction sliding base 27 is guided by a pair of front and rear rails 31, 31 vertically provided on a front-rear direction sliding base 30 such that the vertical direction sliding base 27 can be vertically raised/lowered by an air cylinder 32. Further, the front-rear direction sliding base 30 is guided and supported by rails 36 provided on a base 35 to extend in the front-rear direction, such that the front-rear direction sliding base 30 is slidable in the front-rear direction by an air cylinder 37.

Accordingly, the magnet drums 11, 12 swingably supported by the lateral direction sliding base 25 can move in the front-rear direction by being driven by the air cylinder 37 and be vertically raised/lowered by being driven by the air cylinder 32, so that one of the upper and lower magnet drums 11, 12 to be used is selected and made to face the drum 5 having a curved face at a predetermined position.

Sliding in the lateral direction of the lateral direction sliding base 25 with respect to the vertical direction sliding base 27 is effected by the ball screw mechanism 40. Referring to FIG. 3, the vertical sliding base 27 having an elongated shape in the lateral direction has bearings 27a, 27b provided at the left and right hand side ends thereof, which paired bearings pivotally supports respective end portions of a ball screw 41. A servo motor 42 is mounted at the bearing 27a on the left hand side end such that the ball screw 41 is rotated by being driven by the servo motor 42.

A nut holder 44 for rotatably retaining a nut 43 screwedly engaged with the is ball screw 41 is supported by a support member 45 projectingly provided on the lateral direction sliding base 25. An annular driven gear 43g, through which the ball screw 41 penetrates, is firmly fixed on the left hand side face of the nut 43, so that the driven gear 43a is integrally rotated with the nut 43.

A servo motor 46 is firmly fixed at the support member 45. A drive gear 46g is fittingly engaged with a driving shaft, protruding in the left hand side direction, of the servo motor 46. An intermediate gear 47g, pivotally supported by an intermediate shaft 47 provided so as to protrude from the support member 45 between the servo motor 46 and the nut holder 44, is geared with the drive gear 46g and the driven gear 43g.

The serve motor 46, the gear mechanism of the driven gear 43g, the intermediate gear 47g and the driven gear 43g, and the nut 43 are mounted by the support member 45 on the lateral direction sliding base 25. Accordingly, when the driven gear 43g is rotated integral with the nut 43 by way of the gear mechanism driven by the servo motor 46, the frame body 13 can be moved, together with the nut 43, in the lateral direction via the nut holder 44 and the support member 45 due to rotation of the nut 43 screwedly engaged with the ball screw 41.

Further, due to the rotation of the ball screw 41 driven by the servo motor 42, the frame body 13 can be moved, together with the nut 43 screwedly engaged with the ball screw 41, in the lateral direction via the nut holder 44 and the support member 45.

The frame body 13 for supporting the magnet drums 11, 12 includes a guide member 50 having a flat cylindrical shape and adapted to supply an elongated parallelogram-shaped rubber strip member 1 to the magnet drums 11, 12. The guide member 50 extends from the rear side of the frame body 13 toward a space between the magnet drums 11 and 12.

A rail 51 is provided on the guide member 50 in parallel with the guide member, and a sliding member 52 is slidably engaged with the rail 51. A long groove is formed at a lower wall, on the side of the rail 51, of the guide member 50 in the longitudinal direction. Accordingly, a magnet 53 mounted on the sliding member 52, when the sliding member 52 is inserted into the long groove, can hold by adhesive force the trailing end of the rubber strip member 1 in the guide member 50 and push the rubber strip member 1 on the side of the magnet drums 11, 12 by the movement of the sliding member 52.

The rubber strip member 1 has an elongated parallelogram-like shape obtained by diagonally cutting respective ends of a band-shaped member. The rubber strip member 1, including steel cords embedded therein, is readily held by adhesive force by the magnet 53 and the magnet drums 11, 12.

In the rubber strip piece-attaching apparatus 10 having a structure as described above, the magnet drums 11, 12, for example, are provided with a posture and at a vertical position as shown in FIG. 3 with respect to the drum 5 having a curved face. FIG. 3 is an example in which the rubber strip member 1 is attached onto the drum 5 having a curved face by utilizing the upper side magnet drum 11.

Specifically, the rotation center axis of the upper magnet drum 11 intersects the rotation center axis of the drum 5 having a curved face at the same drum height and the rotation center axis of the upper magnet drum 11 is inclined by a predetermined angle $\theta$ with respect to the rotation center axis of the drum 5 having a curved face. The angle $\theta$ is equal to the acute angle $\theta$ at the leading end of the elongated parallelogram-shaped rubber strip member 1. The magnet drum 11 is moved in the lateral direction such that the magnet drum 11 faces the drum 5 having a curved face at the attachment starting position.

Figure 4:
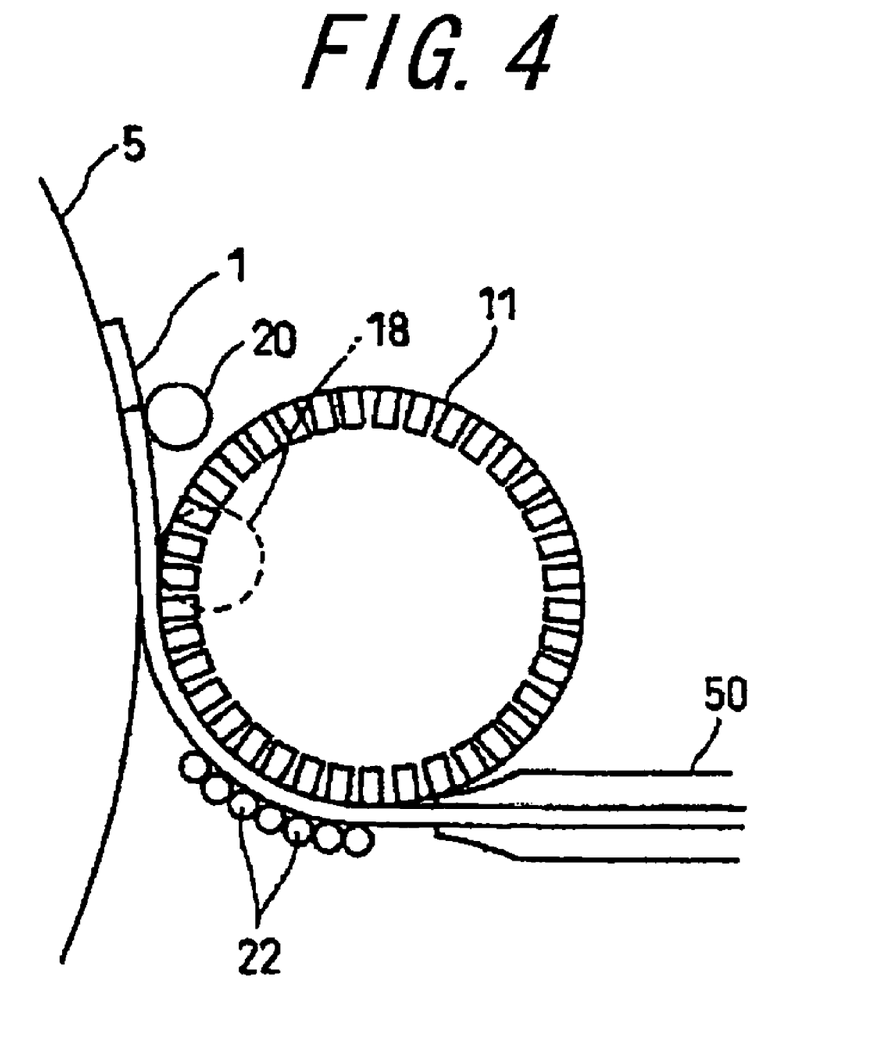
FIG. 4 is side view of the main portions of the rubber strip piece-attaching apparatus, showing a transfer state of the rubber strip piece from the magnet drum to the drum having a curved face.

After the magnet drum 11 has been set in such a state as described above, the rubber strip member 1 in the guide member 50, with the trailing end thereof held by the magnet 53, is pushed out by the sliding member 52. The rubber strip member 1 is pushed out from the outlet of the guide member 50 to a space between the magnet drum 11 and the guide roller 22, as shown in FIG. 4, so that the rubber strip member 1 is continuously held by adhesive force on the magnet drum 11 from the leading end thereof and taken up by the magnet drum 11 between the magnet drum and the guide roller 22 due to rotational driving of the magnet drum 11. When the rubber strip member is taken up by the magnet drum, the magnet 53, which has been holding by adhesive force the trailing end of the rubber strip member 1, cancels holding by adhesive force and releases the trailing end.

When the leading end of the rubber strip member 1 held by adhesive force by the magnet drum 11 reaches, due to rotation of the magnet drum 11, a position where the rubber strip member faces the drum 5 having a curved face, rotation of the magnet drum 11 is stopped and moved forward such that the leading end of the rubber strip member 1 is pressingly attached to the attachment starting position of the drum 5 having a curved face.

The servo motor 7 is then driven to rotate the drum 5 having a curved face, the magnet drum 11 is simultaneously rotated by being driven by the servo motor 16, and the magnet drum 11, driven by the servo motor 42 and the servo motor 46, is moved in the axial direction (the right hand side direction), whereby the rubber strip member 1 is diagonally transferred to and attached on the outer peripheral faceoff the drum 5 having a curved face.

The magnet drum 11 is driven at an outer peripheral face speed equal to or lower than the speed of the outer peripheral curved face of the drum 5 having a curved face, and the one-way clutch 14 is installed between the pulley 16b and the rotation axis 11a. The magnet drum 11 holds by adhesive force the rubber strip piece 1 as the magnet drum rotates and guides the rubber strip piece to the transfer position and, at the time when the transfer is started, respective sides of the rubber strip piece are simultaneously fed by rotations of the drum 5 having a curved face and the magnet drum 11 so that extreme difference in speed between the two sides is eliminated and the leading end of the rubber strip piece is smoothly moved. Thereafter, the outer peripheral face speed of the magnet drum 11 is adjusted to the speed of the outer peripheral curved face of the drum 5 having a curved face by the one-way clutch 14, in rotation of these drums, so that generation of wrinkles or the like in the rubber strip piece due to difference in rotational speed between the two drums is prevented from occurring and a stable transfer is effected.

The leading end of the rubber strip member 1 is pressingly attached onto the drum 5 having a curved face by the magnet drum 11 and then the rubber strip member 1 is peeled off from the magnet drum 11 due to the adhesion force of the rubber strip member 1 with respect to the drum 5 having a curved face. The rubber strip member 1 is more reliably peeled off from the magnet drum 11 and transferred to the drum 5 having a curved face by the pressing roller 18 located slightly on the downstream side of the site where the rubber strip member is pressingly attached to the drum having a curved face. Thereafter, the rubber strip member is continuously transferred to the drum 5 having a curved face. Further, the rubber strip member 1 is pressed, across the overall width thereof, against the drum 5 having a curved face by the pressing roller 20 located on the downstream of the pressing roller 18.

When the trailing end of the rubber strip member 1 has been attached to the drum 5 having a curved face, the magnet drum 11 recedes away from the drum 5 having a curved face and moved to the left hand side to return to the initial attachment starting position. Simultaneous with this, the drum 5 having a curved face is rotated in the reversed direction to make, a position thereof where the leading end of the next rubber strip member 1 is to be attached, face the magnet drum 11.

The aforementioned processes, starting with supply of the rubber strip, are subsequently carried out for the next rubber strip member 1, whereby the next rubber strip member 1 is attached to be adjacent to the rubber strip member 1 which has been previously attached (i.e. such that the next rubber strip member partially overlaps the previously-attached strip member in an edge portion thereof). By repeating these processes, the rubber strip member 1 is attached over the entire outer peripheral face of the drum 5 having a curved face, whereby a belt member is produced.

As described above, when the rubber strip member 1 is attached to the drum 5 having a curved face, the rubber strip member 1 in a state where the rubber strip member is held by adhesive force by the magnet drum 11 and thus the shape thereof is maintained is pressingly attached and transferred to the drum 5 having a curved face, with maintaining the shape of the rubber strip member as it is, whereby the rubber strip member 1 is attached in a desired shape thereof to a desired position at the outer peripheral face of the drum 5 having a curved face.

Figure 5:
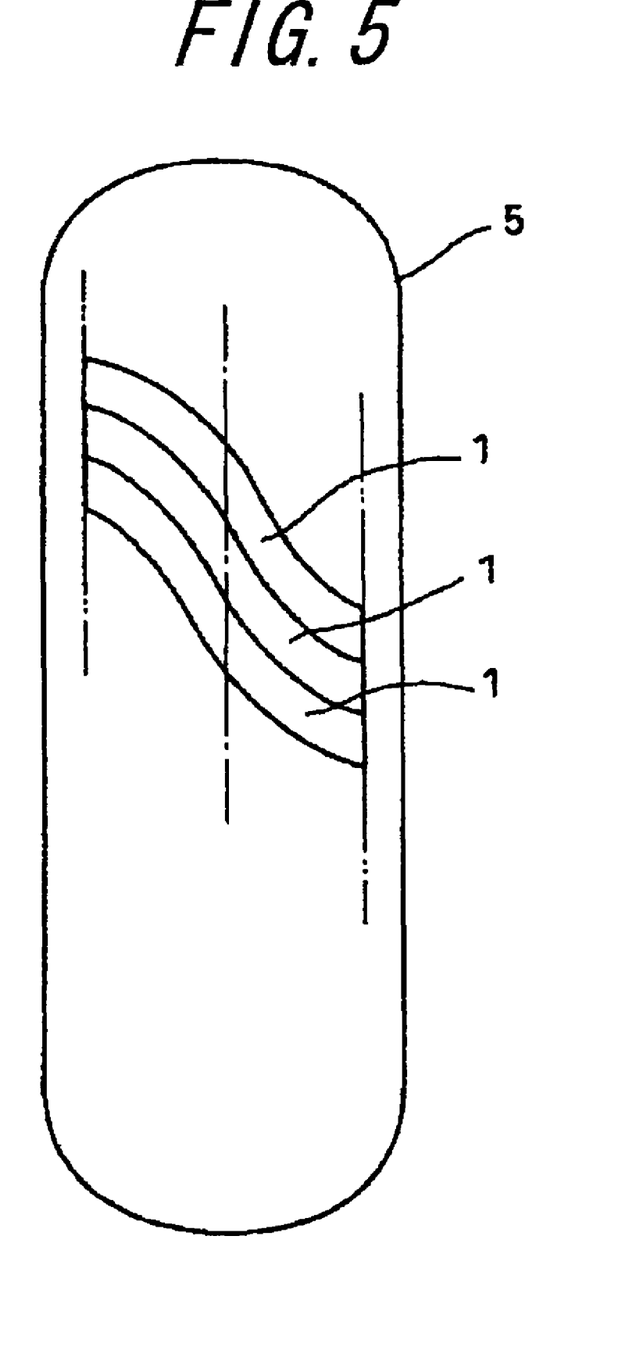
FIG. 5 is a view showing a state in which the rubber strip pieces have been attached on the drum having a curved face.

Specifically, the triangular-shaped portion at the leading end of the rubber strip member 1 and the remaining portion of the rubber strip member continuous therewith are held by adhesive force by the magnet drum 11 and the shapes thereof are maintained till the moment when these portions are transferred to the drum 5 having a curved face, so that the rubber strip member 1 is attached to the drum 5 having a curved face with maintaining the original shape. Therefore, no gap as a gap Sf in the prior art is formed and the rubber strip members are attached regularly adjacent to each other, as shown in FIG. 5.

Similarly, the triangular-shaped portion at the trailing end of the rubber strip member 1 is held by adhesive force by the magnet drum 11 and the shape thereof is maintained, whereby the rubber strip member 1 is attached as it is or in the original shape to the drum 5 having a curved face. Accordingly, the rubber strip member 1 can be attached regularly adjacent to each other, as shown in FIG. 5, without forming a gap as a gap Sr in the prior art therebetween.

As described above, since a belt member is produced by sequentially attaching the rubber strip members 1 adjacent to each other without forming a gap therebetween from the leading ends to the trailing ends thereof, a tire can be produced without having air trapped therein during the overlapping process of the tire component members and thus the high quality of a product tire can be maintained.

The apparatus for producing a tire component member of the present invention, including the rubber strip piece-attaching apparatus 10 and the drum 5 having a curved face, may use either one of the magnet drums 11, 12. Further, the attaching direction and the inclination of the attaching direction may be freely changed for general applicability.

In the present embodiment, the magnet drums 11, 12 are used as an adhesive drum. However, a vacuum drum having plural small holes formed in the peripheral wall thereof and adapted to adhere a rubber strip piece on the outer periphery thereof by suctioning air inside the drum may be used.

The invention claimed is:

1. A method of producing a tire component member by diagonally and sequentially attaching a rubber strip piece having an elongated parallelogram-like shape in the circumferential direction on an outer peripheral curved face of a drum having a curved face including the center portion more expanded than respective side portions, comprising the steps of:

sequentially holding by adhesive force the rubber strip piece from a leading end thereof, with a disposition of the rubber strip piece inclined by a predetermined angle with respect to the drum having a curved face, by an adhesive drum capable of holding by adhesive force the rubber strip piece onto a peripheral surface thereof, while the adhesive drum is rotated and the adhesive drum is provided with a groove formed at the axially center portion thereof, which center groove sections the drum into two lateral parts; and press-attaching the rubber strip piece held by adhesive force continuously from the leading end thereof, onto an outer peripheral curved face of the drum having a curved face which is being rotated, while the rubber strip piece is moved along the direction of the rotation axis of the drum having a curved face within a predetermined range, to transfer the rubber strip piece to the drum having a curved face, wherein when the rubber strip piece held by adhesive force on the adhesive drum is continuously press-attached from the leading end thereof onto the drum having a curved face which is being rotated so that the rubber strip piece is transferred to the drum having a curved face, a pressing roller presses the rubber strip piece against the drum having a curved face, and the pressing roller is pivotally supported in the center groove of the adhesive drum, the pressing roller being independent of the adhesive roller and disposed such that an outer peripheral face thereof is located slightly on the downstream side than a face of the adhesive drum facing the drum having a curved face.

2. The method of producing a tire component member of claim 1, wherein the adhesive drum is driven at an outer peripheral face speed equal to or lower than the speed of the outer peripheral curved face of the drum having a curved face and a one-way clutch is installed in an adhesive drum rotation drive transmission system.

3. The method of producing a tire component member of claim 1, wherein a metal cord is embedded in the rubber strip piece such that the metal cord is disposed along the longitudinal direction of the rubber strip piece and the adhesive drum is a magnet drum.

4. The method of producing a tire component member of claim 2, wherein a metal cord is embedded in the rubber strip piece such that the metal cord is disposed along the longitudinal direction of the rubber strip piece and the adhesive drum is a magnet drum.

5. The method of producing a tire component member of claim 1, wherein plural guide rollers for guiding the rubber strip piece are disposed along the outer periphery of the adhesive drum on the upstream side than a face of the adhesive drum facing the drum having a curved face.

* * * * *